(12) United States Patent
Fouillet et al.

(10) Patent No.: US 12,434,239 B2
(45) Date of Patent: Oct. 7, 2025

(54) MICROFLUIDIC SAMPLE PREPARATION DEVICE OFFERING HIGH REPEATABILITY

(71) Applicants: COMMISSARIAT A L'ENERGIE ATOMIQUE ET AUX ENERGIES ALTERNATIVES, Paris (FR); HORIBA ABX SAS, Montpellier (FR)

(72) Inventors: Yves Fouillet, Grenoble (FR); Anais Ali-Cherif, Clermont-Ferrand (FR)

(73) Assignees: COMMISSARIAT A L'ENERGIE ATOMIQUE ET AUX ENERGIES ALTERNATIVES, Paris (FR); HORIBA ABX SAS, Montpellier (FR)

( * ) Notice: Subject to any disclaimer, the term of this patent is extended or adjusted under 35 U.S.C. 154(b) by 1090 days.

(21) Appl. No.: 17/291,139

(22) PCT Filed: Nov. 7, 2019

(86) PCT No.: PCT/FR2019/052660
§ 371 (c)(1),
(2) Date: May 4, 2021

(87) PCT Pub. No.: WO2020/095000
PCT Pub. Date: Mar. 14, 2020

(65) Prior Publication Data
US 2021/0387190 A1      Dec. 16, 2021

(30) Foreign Application Priority Data
Nov. 9, 2018   (FR) ........................................ 1860403

(51) Int. Cl.
*B01L 3/00* (2006.01)
*B01F 35/88* (2022.01)
(Continued)

(52) U.S. Cl.
CPC .... *B01L 3/502738* (2013.01); *B01F 35/8822* (2022.01); *B01L 3/50273* (2013.01);
(Continued)

(58) Field of Classification Search
None
See application file for complete search history.

(56) References Cited

U.S. PATENT DOCUMENTS

| 2011/0113901 A1 | 5/2011 | Gonzalez |
| 2012/0177543 A1* | 7/2012 | Battrell ................. F04B 43/043 422/187 |

(Continued)

FOREIGN PATENT DOCUMENTS

| EP | 1 111 281 A1 | 6/2001 |
| FR | 3 058 995 A1 | 5/2018 |

(Continued)

OTHER PUBLICATIONS

International Search Report issued Feb. 13, 2020 in PCT/FR2019/052660 filed Nov. 7, 2019, 3 pages.

(Continued)

*Primary Examiner* — Lyle Alexander
*Assistant Examiner* — Mickey Huang
(74) *Attorney, Agent, or Firm* — Oblon, McClelland, Maier &Neustadt, L.L.P.

(57) ABSTRACT

A device for preparing a solution from a sample and a reagent, the device includes a microfluidic array having a sample supply inlet, a reagent supply inlet, a discharge outlet, a solution collection outlet, a sampling zone to which the inlets are connected, first and second preparation chambers connected to the sampling zone, arranged to either side of the sampling zone such that the liquid flowing from one preparation chamber to the other flows through the first sampling zone, the first preparation chamber having a vol- (Continued)

ume that is variable between a minimum volume and a calibrated volume. The device includes valves interrupting the flow of the fluid at least at the two inlets and the collection and discharge outlets.

14 Claims, 9 Drawing Sheets

(51) Int. Cl.
    *G01F 11/28*     (2006.01)
    *G01N 1/38*     (2006.01)

(52) U.S. Cl.
    CPC ............... *G01F 11/28* (2013.01); *G01N 1/38* (2013.01); *B01L 2200/0621* (2013.01); *B01L 2300/0681* (2013.01); *B01L 2300/0816* (2013.01); *B01L 2300/0819* (2013.01); *B01L 2300/0867* (2013.01); *B01L 2400/0655* (2013.01)

(56) References Cited

U.S. PATENT DOCUMENTS

| | | |
|---|---|---|
| 2015/0147777 A1 | 5/2015 | Dothie |
| 2019/0022637 A1 | 1/2019 | Lafferty et al. |

FOREIGN PATENT DOCUMENTS

| | | |
|---|---|---|
| FR | 3 060 746 A1 | 6/2018 |
| JP | 2003-220322 A | 6/2003 |
| JP | 2009-507221 A | 2/2009 |
| JP | 2012-047604 A | 3/2012 |
| JP | 2016-509202 A | 3/2016 |
| JP | 2016-211886 A | 12/2016 |
| KR | 10-2011-0084240 A | 7/2011 |
| WO | WO 2009/029445 A1 | 3/2009 |
| WO | WO 2017/041023 A1 | 3/2017 |
| WO | WO 2007/134191 A1 | 11/2017 |
| WO | WO 2018/091813 A1 | 5/2018 |

OTHER PUBLICATIONS

Preliminary French Search Report issued Aug. 8, 2019 in French Patent Application No. 1860403 filed Nov. 9, 2018, 2 pages (with Translation of Category).

U.S. Appl. No. 16/475,901, filed Jul. 3, 2019, 2019-0344278 A1, Vincent Agache, et al.

* cited by examiner

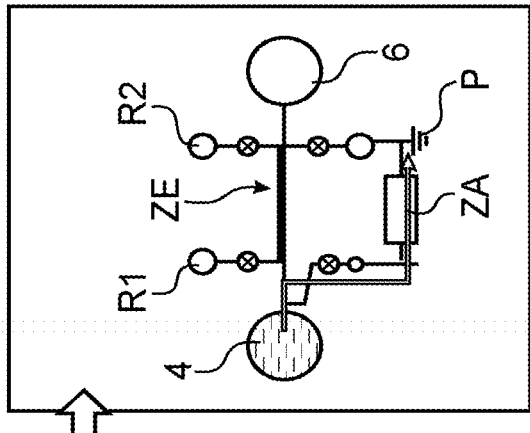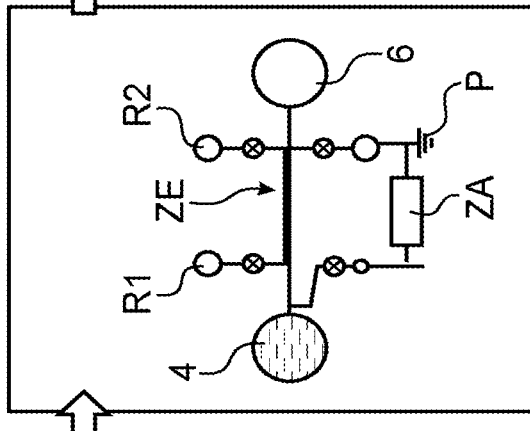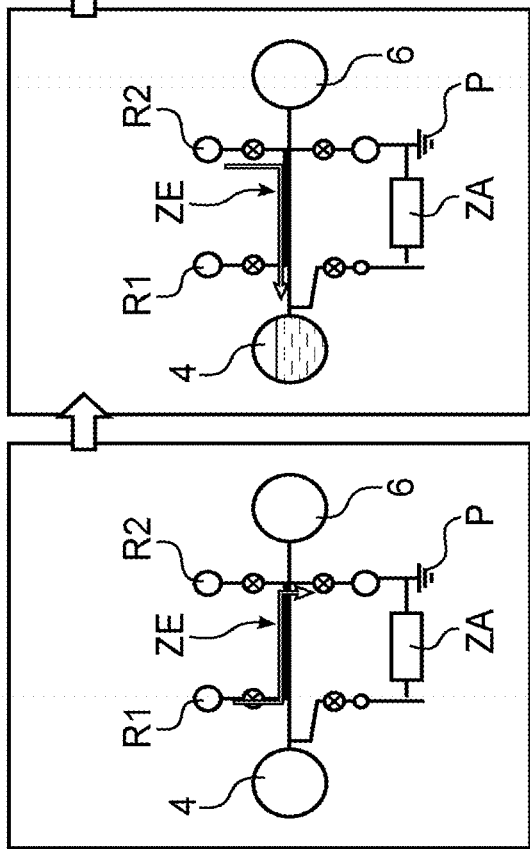

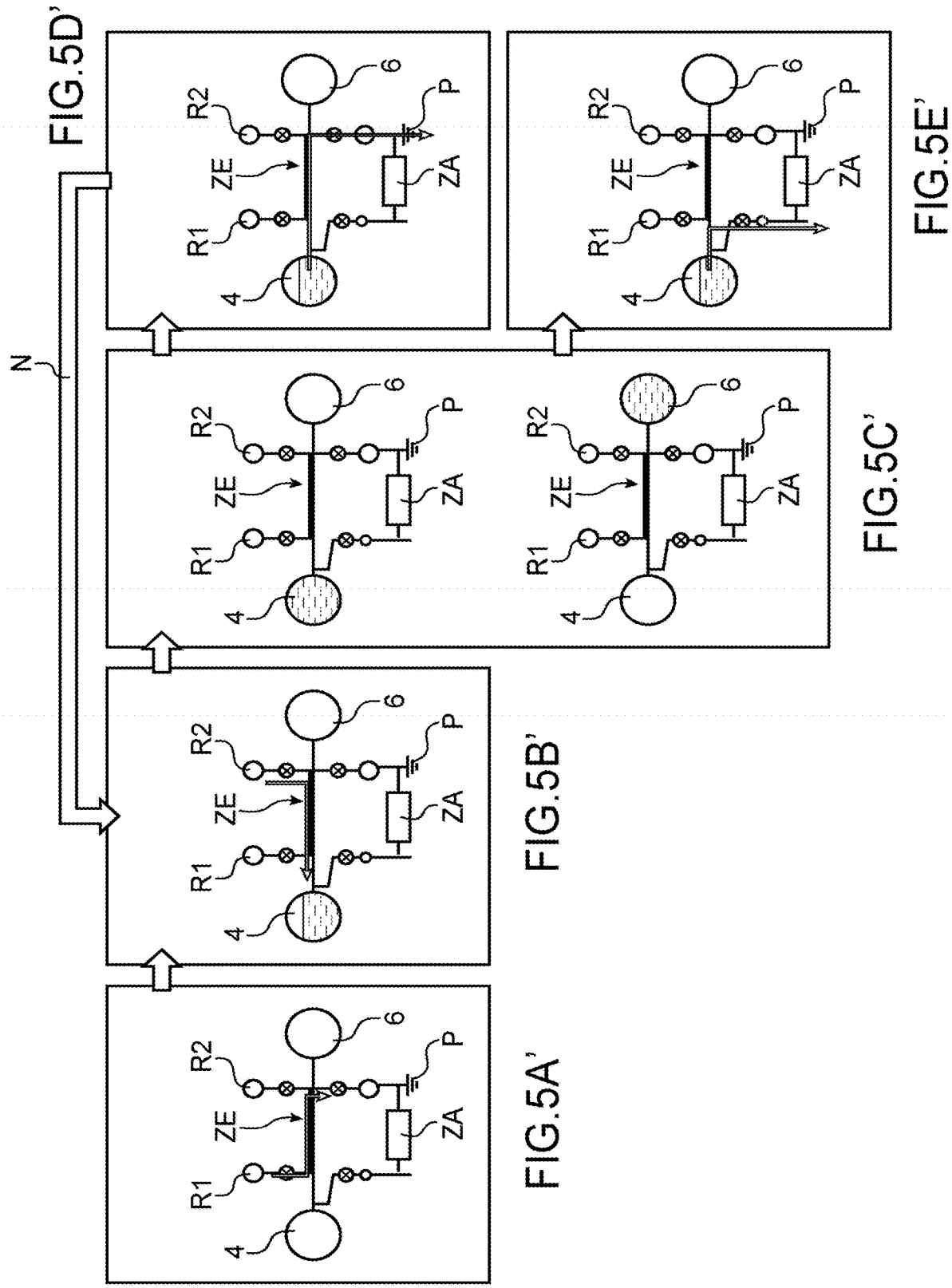

MICROFLUIDIC SAMPLE PREPARATION DEVICE OFFERING HIGH REPEATABILITY

TECHNICAL FIELD AND STATE OF PRIOR ART

The present invention is directed to a microfluidic device for preparing a solution, for example a biological solution for analysis thereof, having high repeatability and high accuracy in the volumes of liquids handled.

In the field of health, in particular in the field of medical analysis, dilutions and/or treatment of formed elements of the blood (white blood cells, red blood cells and platelets) are carried out in order to perform haematological analysis. A treatment can consist of lysis of red blood cells or specific labelling.

These handling operations of blood samples require a high degree of accuracy in the volumes handled, for example to know accurately the concentration after dilution, and a high repeatability.

Further, there is a need to reduce the production cost of microfluidic devices.

There are devices for the preparation of blood for analysis thereof that offer high accuracy and high repeatability, such as current haematology automatons. These are large-size devices. Further, they are used by professionals and require regular maintenance which implies intervention of a technician, which represents an additional cost. This maintenance further involves periods of inactivity. Besides, the amounts of liquids (blood and reagent) used can be large.

Document EP1111281 describes a biological analysis device comprising a chip in which a fluidic network is structured. Valves are also made. The circuit is connected to a source of propellant gas which ensures movement and mixing of liquids. The circuit comprises at least two channels, each of which is used to measure the volume of a liquid, and both channels being connected to a common coil into which both liquids are injected for mixing thereof. On the one hand, the movement of liquids by air requires management of the air-biological liquid interface which can be tricky. On the other hand, two volumes of liquid are filled and then moved, the accuracy of the dilution will depend on the movement of both liquids to mix them in the coil, and during the movement there can be problems of wetting and de-wetting likely to yield a loss of part of either of both liquids.

In addition, an air purge is required to avoid any presence of another liquid in the circuit, air bubbles can appear in the mixture and distort measurements.

DISCLOSURE OF THE INVENTION

It is therefore a purpose of the present invention to provide a microfluidic device for preparing a solution offering accuracy and repeatability at least in the order of those of devices of the state of the art with a reduced overall size.

A solution can be a liquid or gaseous solution.

The solutions are prepared from at least one fluidic sample comprising particles dispersed in a medium or a species soluble in a medium, and a fluidic reagent provided, for example, either for dilution, or for acting on the particles of the sample for example to perform lysis in the case of a blood sample, or to label said particles.

The particles can be cells, cell fragments, or microorganisms, microalgae or fragments thereof. The term "particles" can also refer to microbeads, for example metal microbeads, glass microbeads or organic microbeads, commonly implemented in biological protocols. It can also refer to insoluble droplets immersed in a liquid medium, for example lipid droplets in an oil-in-water type emulsion. Thus, the term "particle" both refers to endogenous particles, initially present in the sample under examination, and exogenous particles, added to the sample prior to analysis. A soluble species can be an ion, a molecule (protein, metabolite, vitamin, hormone, co-factor, drug, etc.) or a macromolecular assembly.

A liquid sample can be a body fluid, for example, but not limited to, blood, plasma or blood serum, urine, lymph or cerebrospinal fluid. For example, in the case of a blood sample, the particles are formed elements of the blood.

For example, the reagent can be:
In the case of dilution, buffered saline e.g. PBS or commercial dilution reagents e.g. ABX Diluent;
In the case of lysis, a known $NH_4Cl$ solution or commercial reagents marketed as Whitediff®, etc;
In the case of labelling: for nucleic acid labelling, the reagent can be thiazole orange for example (reagent marketed as ABX Retix®), labelling can consist of staining and immunolabelling.

The purpose stated above is achieved by a microfluidic device for preparing a solution for analysis thereof, comprising a microfluidic network comprising at least one connection inlet, for example to a reservoir containing the sample, at least one connection inlet, for example to a reservoir containing the reagent, at least one discharge outlet, at least one collection outlet for the solution to be analysed and a sampling zone having a given volume. The device also comprises at least two preparation chambers connected to the sampling zone and disposed on either side of the sampling zone, so that the fluid circulating from one preparation chamber to the other circulates in the sampling zone. The device also comprises means capable of controlling fluid circulation in the different parts of the circuit, for example at least one of the preparation chambers being a chamber having a variable volume between a first zero volume and a second given volume. The device is for cooperating with a system for controlling fluid circulation and volume control means by controlling the volume of the variable volume chamber.

By virtue of the invention, the volume of the sample portion is defined by the sampling zone, and then is injected into the variable volume preparation chamber, and the volume of the reagent is defined by making up the preparation chamber until its volume reaches the second given volume. Thus the dilution rate is set by the volumes of the sampling zone and the preparation chamber.

Further, since the volume of the preparation chamber increases simultaneously with the injection of the fluids, the risk of air bubbles appearing in the mixture is reduced. Advantageously, the first volume of the preparation chamber is zero. Purging is therefore not required.

Apart from both preparation chambers, the mixture can be transferred from one chamber to the other through the sampling zone, which, on the one hand, improves mixing of both fluids and, on the other hand, makes it possible to collect an amount of the first fluid that may have remained in the sampling zone.

This design further allows very advantageously one of the preparation chambers to be pre-filled before injecting the sample, which especially improves mixing in the case of blood.

Very advantageously, the reagent supply inlet is located upstream of the sampling zone in the direction of one of the preparation chambers. Thus, upon injecting the reagent into the preparation chamber, this circulates in the sampling zone and collects at least partly possible traces of the sample that may have remained in the sampling zone.

In other words, an aliquot is taken by filling at least one channel having a calibrated volume which is transferred to a chamber, the remaining volume of which is made up with the reagent to a calibrated volume. The total volume of the desired solution is the calibrated volume of the chamber. Production of the solution is simplified and limits risks of fluid loss during transfer operations.

One subject-matter of the present invention is therefore a device for preparing at least one solution from at least one first sample and at least one first reagent, comprising a microfluidic network comprising at least one first supply inlet for a first sample, at least one second supply inlet for a first reagent, at least one discharge outlet, at least one collection outlet for the solution to be analysed, a first sampling zone to which the first and second inlets are connected, at least first and second preparation chambers connected to the first sampling zone, and disposed on either side of the sampling zone so that the fluid for circulating from one preparation chamber to the other circulates in the first sampling zone, at least the first preparation chamber having a variable volume between a minimum volume V0 and at least one calibrated volume Vc, said device also comprising means for allowing or interrupting fluid circulation at least at the first and second inlets, and at the collection and discharge outlets.

Advantageously, the second preparation chamber also has a variable volume between the minimum volume V0 and at least one calibrated volume Vc.

In a particularly advantageous exemplary embodiment, the first and/or second preparation chambers comprise a wall of hyperelastic material to be deformed until the volume of said chamber is at least equal to Vc.

Preferably, the second supply inlet for the first reagent is connected to the sampling zone, so that upon injecting the first reagent into the first preparation chamber, the first reagent passes through the sampling zone.

According to an additional feature, the device comprises means for allowing or interrupting fluid circulation which are located at the inlet of the first preparation chamber.

According to an additional feature, the device comprises at least one additional supply inlet for a second reagent, a second sampling zone and third and fourth preparation chambers connected to the sampling zone and disposed on either side of the second sampling zone so that the fluid for circulating from one preparation chamber to the other circulates in the second sampling zone, at least the third preparation chamber having a variable volume between a minimum volume V0' and at least one calibrated volume Vc', the second sampling zone being connected to the first supply inlet for a first sample so that, upon filling the first sampling zone, the second sampling zone is filled, and means for allowing or interrupting fluid circulation which are located at the inlet of the third preparation chamber.

The preparation device can comprise at least one supply inlet for a circuit flushing fluid and/or means for generating gas bubbles having a calibrated volume upstream of the collection outlet.

Another subject-matter of the present invention is an assembly comprising at least one preparation device according to the invention and a support comprising at least the sample reservoir, at least the reagent reservoir, control means configured to activate means for actuating the means for allowing or interrupting fluid circulation, means for modifying the volume of the at least first preparation chamber, and analysis means connected to the collection outlet.

Preferably, the control means are configured to transfer the solution between the first preparation chamber and the second preparation chamber through the sampling zone.

In one advantageous example, the control means are configured to inject, into the first preparation chamber, a first amount of reagent, prior to injecting a volume of sample measured by the sampling zone.

The analysis means can allow elements contained in the solution to be quantified and/or qualified.

Another subject-matter of the present invention is a method for preparing a solution implementing a preparation device according to the invention comprising:
a) a sampling phase during which the sampling zone is filled with the sample,
b) a phase of injecting the volume of sample Ve contained in the sampling zone into the first preparation chamber,
c) a phase of injecting a volume of reagent into the preparation chamber until the volume of the first preparation chamber reaches the calibrated volume Vc,
d) a phase of transferring the solution between the first and second preparation chambers so as to mix it and collect sample traces in the sampling zone.

The injection phase c) advantageously takes place through the first sampling zone.

Preferably, the preparation method comprises a step of injecting an amount of reagent into the first chamber prior to injecting the calibrated volume of sample.

Another subject-matter of the present invention is a method for analysing a solution implementing the assembly according to the invention, comprising preparing the solution and transferring the solution from one of the preparation chambers to the analysis means through the collection outlet.

BRIEF DESCRIPTION OF THE DRAWINGS

The present invention will be better understood based on the following description and the appended drawings in which:

FIGS. 5A to 5D are schematic representations of the circuit of FIG. 4 during different operating steps, FIGS. 5A' to 5E' are schematic representations of the circuit of FIG. 4 used to make a solution cascade diluted N times.

DETAILED DISCLOSURE OF PARTICULAR EMBODIMENTS

In the following description the fluids implemented are liquids. The description also applies to gaseous fluids.

Figure 1:
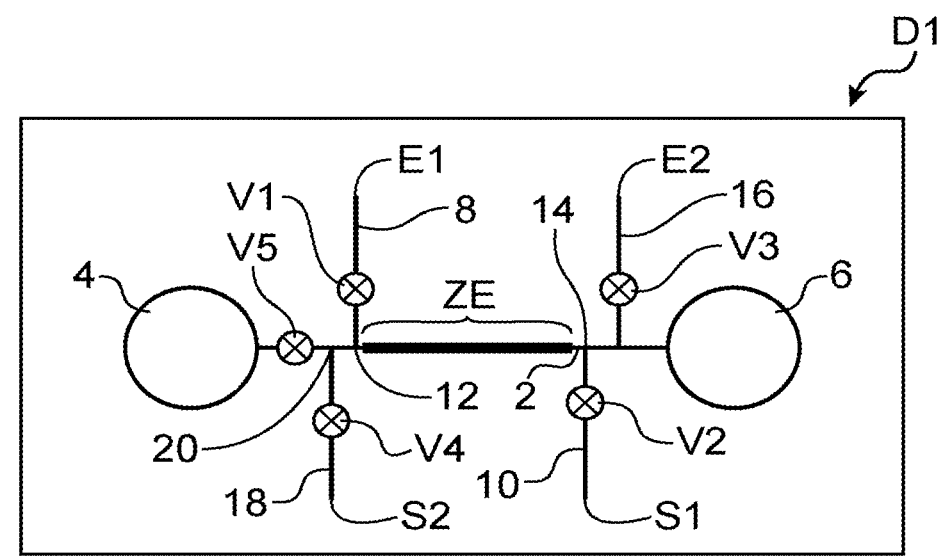
FIG. 1 is a schematic representation of an example of a device for preparing a solution.

In FIG. 1, a schematic representation of a device D1 for preparing a liquid solution for analysis thereof according to one exemplary embodiment can be seen.

The preparation consists for example of a dilution of the sample, a treatment of part of the sample components, for example lysis in the case of blood, or labelling of an aliquot of whole blood with a reagent. For example, analysing the solution thus prepared can consist in counting the formed elements in the blood or measuring a soluble species such as haemoglobin after lysis of red blood cells.

The preparation device is preferably designed as a fluidic chip for cooperating with a chip support ensuring pneumatic activation of the chip.

The preparation device is for preparing a solution comprising a given volume of sample, for example blood, and a given volume of reagent.

The preparation device D1 comprises a fluidic circuit comprising a sample supply inlet E1, a reagent supply inlet E2, a discharge outlet S1, for example connected to a waste bin, and a collection outlet S2 for collecting the solution prepared, for example for analysis thereof.

The fluidic circuit also comprises a main channel 2, a first preparation chamber 4 and a second preparation chamber 6. The first chamber 4 and the second chamber 6 are disposed on either side of the main channel 2 and are connected to each other via the main channel 2.

The sample supply inlet E1 is connected to the main channel 2 via a first secondary channel 8, and the discharge outlet S1 is connected to the main channel 2 via a second secondary channel 10. The first secondary channel 8 connects to the main channel 2 at a first connection 12, and the second secondary channel 10 connects to the main channel 2 at a second connection 14. The portion of the main channel 2 delimited between the first 12 and second 14 connections forms a sampling zone ZE. The sampling zone has a calibrated volume Ve corresponding to the amount of sample participating in preparing the sample. For a main channel with a constant cross-section area, Ve is therefore defined by the cross-section area of the main channel between connections 12 and 14 and the length of the channel between connections 12 and 14.

The volume of sample to be taken is small. By using a fixed volume sampling zone, this small volume is accurately measured.

As will be seen in the following of the description, the sampling zone also has the function of promoting mixing between the amount of sample and the reagent. Advantageously, at least part of the portion of the main channel 2 forming the sampling zone ZE, and preferably the entire portion of the main channel forming the sampling zone, has a geometry that improves mixing. For example it has a coil shape or any other shape well known to those skilled in the art, for example three-dimensional channels separating and gathering the flow. Further, for example the coil shape allows the device to be made more compact.

In one exemplary embodiment, a channel for the sampling zone is chosen to have a larger cross-section area than the other channels in order to have a larger volume of sample, while limiting overall size.

In the example represented and very advantageously, the reagent supply inlet E2 is connected to the main channel 2 upstream of the sampling zone ZE with respect to the first preparation chamber 4 by a third secondary channel 16, so that the reagent coming from the reagent supply inlet E2 circulates in the sampling zone before entering the first preparation chamber 4.

Inlets E1 and E2 are directly connected to the sampling zone, that is, liquid injected through these inlets enters directly into the main channel 2 which comprises the sampling zone.

In the present application, by "connected directly to the sampling zone" it is meant that the channel lengths between the inlets and the sampling zone are minimal, that is, at most, no chambers or junctions are interposed between the inlets and the sampling zone. This definition applies to any other inlet or outlet and any element of the device that will be described as directly connected to the sampling chamber.

In the example represented, the collection outlet S2 is connected to the main channel 2 via a fourth secondary channel 18 and a connection 20 located between the first preparation chamber 4 and the first connection 12.

Means, for example valves, are provided to isolate different parts of the fluidic circuit during operation.

In the example represented, a valve V1 is provided in the first secondary channel 8, a valve V2 is provided in the second secondary channel 10, a valve V3 is provided in the third secondary channel 16, a valve V4 is provided in the fourth secondary channel 18 and a valve V5 is provided between the first preparation chamber 4 and the connection 20. It should be noted that the valve V5 can be omitted, as will be seen later, the valve V5 being particularly advantageous in the case where pre-filling of the preparation chamber 4 with reagent is performed. A valve can also be implemented at the inlet of the second preparation chamber 6.

The first preparation chamber 4 is a chamber having a variable volume between a volume V0 equal to or close to zero, and a calibrated volume Vc. Preferably, as will be seen below, controlling the volume of the first chamber 4 can be such as to ensure a volume V0 of zero.

The first preparation chamber 4 comprises at least one deformable or movable wall. The volume of the first chamber 4 is the volume at least partly delimited by the movable or deformable wall.

The calibrated volume Vc is the volume of the solution to be analysed, this total volume being defined together with the volume of the sampling zone ZE, the desired dilution rate or the ratio of the amount of sample to the amount of reagent.

The volume Vc is equal to the maximum volume Vmax of the first chamber, improving accuracy and robustness of the device.

As the volume of reagent to be added to the volume Ve of sample is large, the inaccuracy that can result from implementing a variable volume chamber, in particular one with a deformable wall for calibrating the volume of reagent, is negligible.

The means controlling the expansion of the chamber 4 are configured to set the dilation of the chamber to Vc.

For example, the first chamber 4 is a piston chamber, for example a syringe. Advantageously, the first preparation chamber 4 comprises a wall of elastically deformable material, preferably of hyperelastic material.

By "hyperelastic material" it is meant that the material has a surface capable of reversibly changing from a first area to a second area, the second area being equal to 5 times or even 10 times or even 50 times the first area.

The variation in the volume of the first chamber is achieved by pneumatic actuation. The pneumatic actuation is controlled to deform the membrane so that it reaches volume Vc.

Preferably the first chamber 4 has a shape that facilitates pressing of the deformable wall against the non-deformable walls of the chamber, for example it has a cylindrical or spherical cap or ovoid portion shape. However, due to the hyperelastic properties of the membrane, the chamber can have a less adapted shape, for example a parallelepipedal pyramidal shape, with pillars formed by elements protruding from a wall of the chamber.

The so-called "non-deformable walls" are non-deformable relative to the hyperelastic membrane and are non-deformable at the pressure level implemented. The pressure used is for example between +/−a few tens of mbar and a few bars, typically between +/−500 mbar, for example equal to 250 mbar, or 450 mbar, which makes it possible to deform the deformable wall more quickly.

In a very advantageous example, the first chamber 4 comprises grooves formed in one or more walls of the chamber, different from the deformable wall, allowing bubbles to be expelled when priming the chamber, thus controlling that the volume of liquid entering the chamber is as close as possible to the expected volume.

Figure 2A:
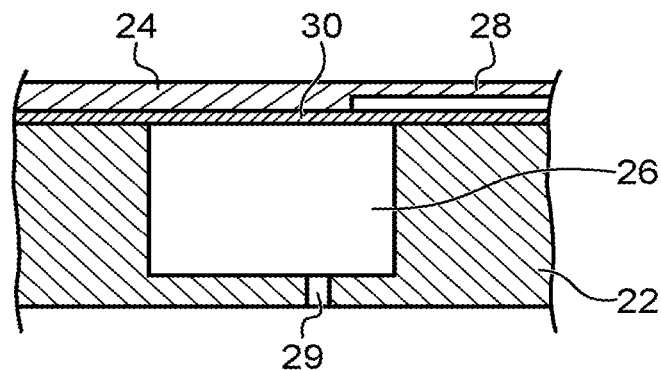
FIGS. 2A and 2B are schematic representations of an example of a deformable preparation chamber which can be implemented in the device of FIG. 1, in two states, one with zero volume, and the other with maximum volume.
Figure 2B:
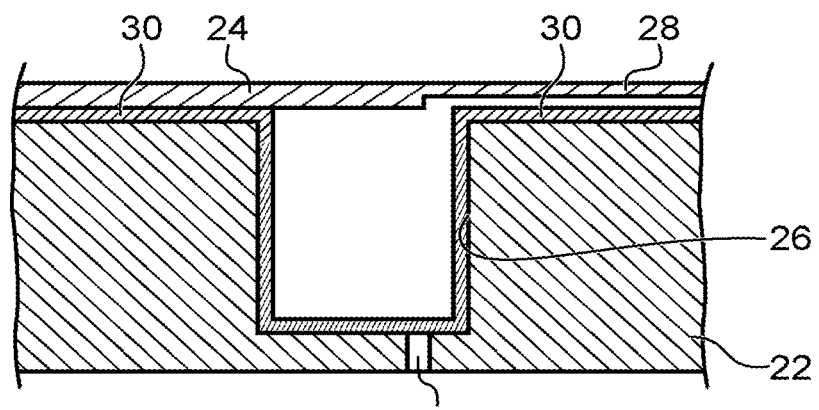

In FIGS. 2A and 2B an example of a chamber with a deformable wall can be seen.

The preparation chamber 4 is delimited between two rigid plates 22, 24. The plate 22 comprises a cavity 26 provided in a face of the plate 22, and the plate 24 comprises at least one channel 28 made in a face of the plate 24 facing the face of the plate 22 comprising the cavity 26. A membrane 30 of hyperelastic material is tensioned over the cavity 26 and closes the cavity. A pressure inlet 29 is formed in the support plate 22 and opens into the cavity. In a resting state, the membrane 30 is more or less pressed against the plate 24 and the volume of the chamber is equal to V0 (FIG. 2A). Preferably, in the resting state or at least just before a sampling step, pressure is applied through pressure inlet 29 to ensure that the membrane 30 is pressed against plate 24 and that V0=0.

When suction is generated in the cavity 26, the membrane 30 is deformed towards the cavity 26 until it comes to press against the walls of the cavity 26, in which state the volume of the chamber is maximal (FIG. 2B). This pressing is made possible by hyperelasticity properties of the membrane. In this configuration the chamber can be filled.

Alternatively, the deformable wall can be deformed by piezoelectric or electromagnetic means, for example integrated into the membrane.

The valves can be of any type. Advantageously they are pneumatically actuated and also comprise a hyperelastic membrane.

Figure 3A:
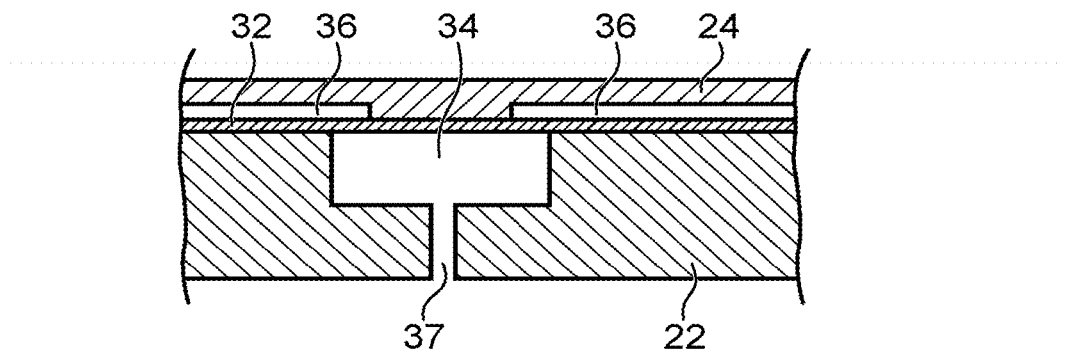
FIGS. 3A and 3B are schematic representations of an example of a valve that can be implemented in the device of FIG. 1.
Figure 3B:
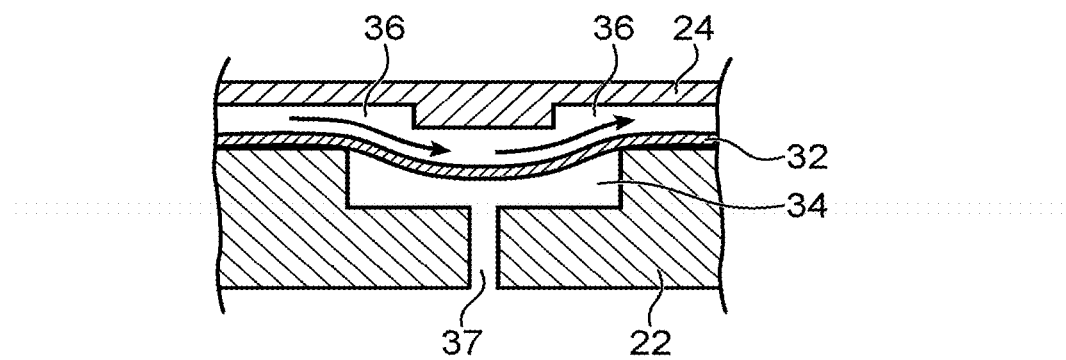

In FIGS. 3A and 3B, an example of such a valve can be seen. The membrane 32 is tensioned over a cavity 34 connected to a pressure source. The cavity 34 is made in a support, for example plate 22, and another support, for example plate 24, rests on the membrane. The plate 24 comprises a discontinuous channel formed by channel portions 36 structured in the face of the support 24, in contact with the membrane 32. The channel portions connect through the cavity. Preferably a pressure is applied through the inlet 37 to ensure that the membrane is pressed against the plate 24 and the valve is closed, circulation between the channels is then interrupted (FIG. 3A). By generating an underpressure in the cavity 34 through the inlet 37, the membrane 32 deforms and allows the circulation between both channel portions 36 (FIG. 3B). The fluid circulation is symbolised by arrows. Preferably the membrane 32 and the membrane 30 are formed by the same film of hyperelastic material. Alternatively, a mechanical finger can act on the membrane.

Alternatively, the plate 24 comprises a continuous channel, and the membrane is pressed into the bottom of the channel.

Alternatively, piezoelectrically or electromagnetically actuated valves can be implemented.

The actuation of the valves causes an empty space of fluid to move. In order to limit effects on the accuracy of the volume ratio between sample and reagent, the valves preferably have a small volume, for example 100 times smaller than volumes of the preparation chambers. The valves can be normally open or normally closed.

The second preparation chamber 6 also has a variable volume. The different alternatives of the first preparation chamber described above apply to the second preparation chamber, such as cylindrical or spherical cap shape, drainage grooves, etc.

The implementation of two variable volume chambers allows the fluid to be easily transferred between both chambers through the sampling zone and the entire sample to be collected from the sampling zone ZE.

Advantageously, the second preparation chamber 6 has a volume greater than or equal to that of the first preparation chamber. Preferably, both chambers 4 and 6 have the same calibrated volume Vc which is advantageously equal to the maximum volume of the chambers.

Alternatively, the second preparation chamber has a different volume from that of the first chamber 4, which can be smaller than that of the first preparation chamber 4. The second chamber 6 is such that it can be completely emptied as will be explained below.

Figure 4A:
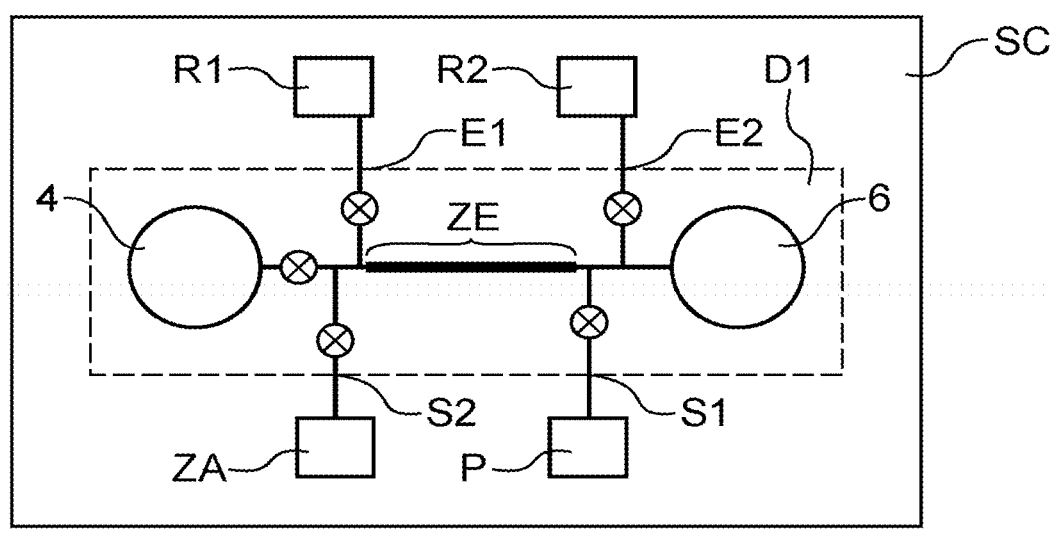
FIG. 4A is a schematic representation of an example of a complete fluidic circuit formed by the circuit of the preparation device of FIG. 1 and the chip support.

In FIG. 4A, a schematic representation of the complete fluidic circuit formed by the circuit of the preparation device D1 and a chip support Sc can be seen.

The chip support ensures connection of the sample supply inlet E1 to a reservoir R1 containing the sample, and connection of the reagent supply inlet E2 to a reservoir R2 containing the reagent, the outlet S1 to a waste zone P and the outlet S2 to an analysis zone ZA of the solution to be analysed. The analysis zone comprises means for detecting and quantifying a formed or soluble species initially present in the sample. The means can implement an electrical, optical or electrochemical measurement. For example, the analysis zone comprises optical means for counting/quantifying elements and/or means for determining the different types of element. For example, it can be a flow cytometer and/or impedance measurement means of the Coulter counter type and/or optical measurement means of the imaging type and/or colourimetric analysis means.

Alternatively, the analysis zone ZA is integrated into the preparation device.

The chip support also ensures control of the valves and the variable volume chamber(s). Further, the chip support comprises an electronic circuit for controlling the valves and the variable volume chamber(s).

The chip support also comprises a pneumatic circuit connected to the first preparation chamber or to the first and second preparation chambers, and connected to a pressure source D. The pressure source D comprises an overpressure source Ds or an underpressure source Dd. In an advantageous alternative, the reservoirs R1 and R2 are at atmospheric pressure.

Sealing between the support chip and the device is achieved for example by means of seals.

The chip support comprises an electronic unit controlling the various valves and chambers according to predefined protocols.

Figure 4B:
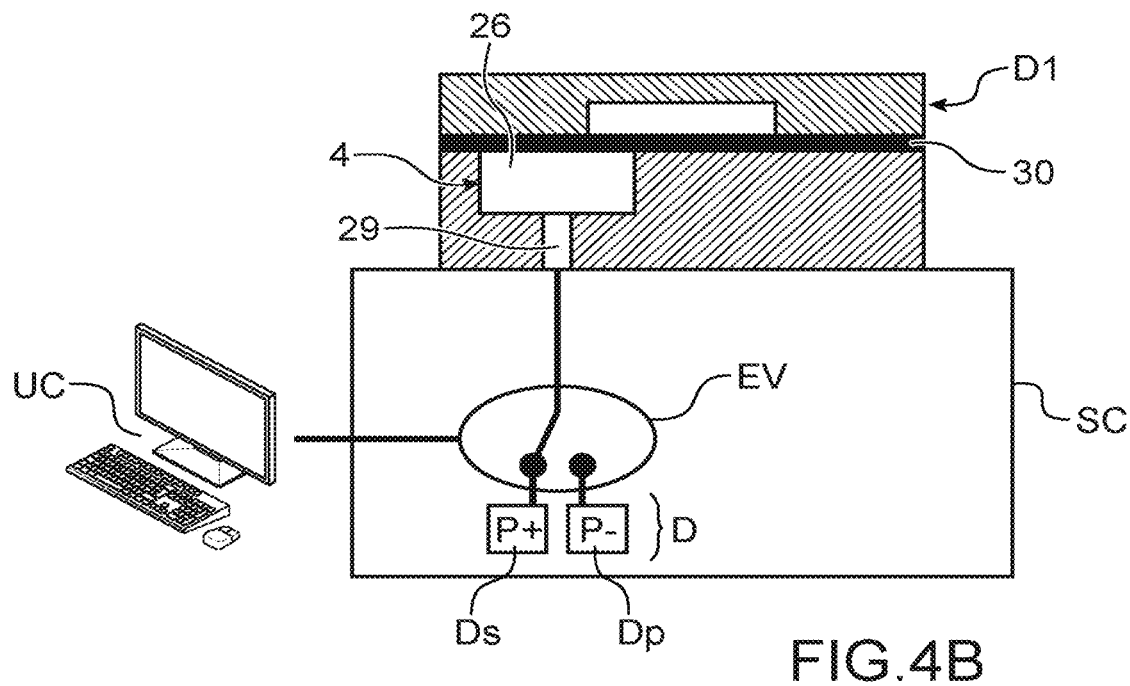
FIGS. 4B and 4C are schematic representations of a preparation chamber of a preparation device on a chip support, a pneumatic circuit for controlling the chamber and a control unit in two different states.
Figure 4C:
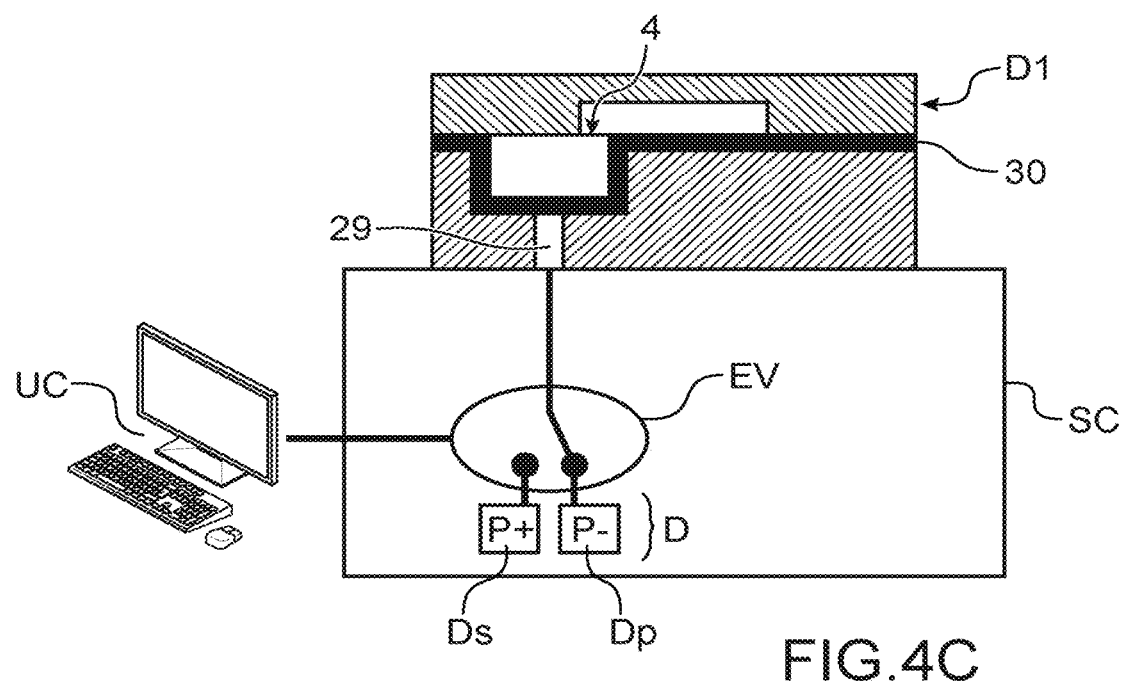

In FIGS. 4B and 4C, a schematic representation of the first preparation chamber 4 on the chip support Sc comprising a pneumatic circuit Sp controlled by a control unit UC, for example a computer, can be seen. The pneumatic circuit Sp comprises for example a three-way valve EV connecting the cavity of the chamber 4 to the pressure source D. The three-way valve allows the cavity of the chamber 4 to be connected to either the overpressure source Ds or the underpressure source Dd.

In FIG. 4B, and prior to a preparation phase, the control unit UC controls the valve EV so that it connects the cavity of the chamber 4 to the overpressure source, thus ensuring that the chamber volume V0=0.

In the preparation phase the UC controls the EV valve such that it connects the cavity to the underpressure source, which increases the chamber volume and sucks the sample. By controlling the valve EV, the volume of the chamber is alternately increased and decreased, especially allowing for back and forth movements between chambers 4 and 6.

It will be understood that the chip support Sc comprises several valves for the controlled supply of overpressure or underpressure to the cavities of the different preparation chambers, for example as many valves as there are preparation chambers, each of which being individually controlled.

An example of operation of the preparation device D1 will now be described from FIGS. 5A to 5D.

Advantageously, initially at least the valve controlling the pressure in the cavity of the first chamber 4 is switched so that an overpressure is applied in the cavity of the chamber 4 so that the volume of the chamber 4 is V0=0.

A sampling phase is performed. Valves V1 and V2 are opened and the underpressure source connected to outlet S1 is actuated, the sample is sucked from reservoir R1. The underpressure source is activated until the sample fills the first secondary channel 8, the sampling zone ZE between connections 12 and 14. Preferably, the underpressure source is activated until the sample fills the entire second secondary channel 10 or a part of it, in order to be sure that the sampling zone ZE is filled with sample homogeneously.

For example, the underpressure source is time-controlled. The activation time of the underpressure source has been calibrated. Tests have been carried out beforehand to determine the period of time required for filling, a precautionary margin is taken. Alternatively, a visual control can be contemplated, for example in the case of blood.

The amount of sample in the sampling zone ZE is the aliquot having a volume Ve.

The device is in the state represented in FIG. 5A.

Next, a reagent injection phase takes place. Valves V1 and V2 are closed again. Then valves V5 and V3 are opened. The valve EV is switched, connecting the underpressure source to the cavity of the first chamber 4, which causes the volume of the first preparation chamber 4 to increase. For example, in the case of a chamber with a hyperelastic wall, the membrane deforms, the volume of the chamber increases, creating an underpressure in the circuit, the sample contained in the sampling zone is sucked into the first preparation chamber 4, causing the reagent contained in the reservoir R2 to be sucked. The reagent circulates into the sampling zone ZE after the aliquot has been sucked in, which advantageously allows an amount of sample that remained in the main channel, for example, to be collected. Since the volume of the preparation chamber increases with the injected liquid, the risk of bubbles appearing is greatly reduced.

The connection time between the underpressure source and the cavity of the first chamber 4 is long enough to ensure that the chamber reaches the volume Vc.

The first chamber having a volume Vc contains a volume Ve of sample and a volume Vc−Ve of reagent. The first preparation chamber 6 is completely full at the end of filling, allowing the volume Vc−VE of reagent to be calibrated. Thus, since the volumes Ve and Vc are calibrated, the ratio of the volume of sample to the volume of reagent is known accurately. For example, in the case of a dilution, the dilution rate and the concentration of the elements in the sample are known accurately. Further, with each new preparation operation, the same ratio between the volumes is obtained. The device therefore has a very robust operation.

The device is in the state represented in FIG. 5B.

In one advantageous operation, a mixing phase of the solution takes place. For example, the solution is circulated between both preparation chambers 4 and 6.

For this, the valve EV is switched to supply the cavity of the first chamber 4 with overpressure, causing a reduction in the chamber 4, and simultaneously the volume of the second chamber 6 is increased by supplying to the cavity of chamber 6 with underpressure. The solution is then expelled from the first chamber 4 and is sucked into the second chamber. During this transfer between both chambers, the solution circulates into the main channel 2 and thus into the sampling zone ZE.

It is to be noted that before the mixture is transferred from chamber 4 to chamber 6, the sampling zone is filled with reagent. This volume Ve of reagent will be added to the volume Vc−Ve of reagent present in chamber 4 and is to be taken into account in dilution calculations or in reaction observations. At the end of the transfer phase between the chambers, the solution obtained has a volume Vc+Ve. The dilution rate obtained is Ve/(Ve+Vc).

By alternating increase and decrease in the volumes of both chambers 4, 6, by switching the pneumatic valves, the solution moves back and forth in the sampling zone ZE. These back and forth movements have the advantage of improving mixing between both liquids, especially when the sampling zone has a coil shape or another shape that promotes mixing and for example a reaction such as lysis. Furthermore, they allow any remaining sample and analytes possibly remaining in the sampling zone, to be collected. Thus sample loss can be reduced and preparation can be very accurate.

All or part of the volume Vc of the solution can be transferred to the second chamber 6, a part of which can remain in the sampling zone. Preferably, a large volume of solution circulates in the sampling zone ZE to collect sample residues. For example, the entire volume Vc of the solution circulates between both preparation chambers 4, 6.

The number of back and forth movements is chosen depending on the liquids involved, and relative volumes Vc and Ve, type of reaction, whether it is a dilution, lysis, labelling, etc.

The device is in the state represented in FIG. 5C.

Finally, the solution is returned to the first preparation chamber 4 and then sent into the analysis zone ZA. For this, valves V4 and V5 are opened and the solution is for example sucked through outlet S2.

The device is in the state represented in FIG. 5D.

During a final phase, the circuit is emptied and/or flushed for further preparation and analysis, by suction at the outlet S1 to the waste zone.

By combining a fixed-volume sampling zone to measure the volume of sample and a variable-volume preparation chamber to measure the volume of reagent, a device with a relatively simple design and offering very good accuracy is made.

Both variable volume chambers can be controlled by a single control or two distinct control operations.

Alternatively, the second chamber 6 can have a maximum volume smaller than the volume Vc of the first chamber 4, only a part of the volume Vc of the first chamber 4 is then transferred.

In a very advantageous operating mode, the first preparation chamber is already partially filled with reagent before injecting the sample, for example blood, which promotes homogenisation of the mixture and reactions within the mixture if any, and avoids sample losses and thus accuracy loss.

For example, before the sampling phase, a pre-filling phase of the first preparation chamber 4 with an amount of reagent is provided. For this, only valves V3 and V5 are opened, and the underpressure source causes the deformation of the hyperelastic wall, the reagent is then sucked in through the main channel. The amount of reagent injected into the first chamber 4 is smaller than Vc−Ve so that the entire aliquot can then be injected into the first chamber 4.

Then valves V3 and V5 are closed and the sampling phase can start. A valve V5 is disposed between the first chamber 4 and the connection 12, and is closed during the sampling phase, in order to avoid sucking of the reagent contained in the first preparation chamber 4 when the sample is sucked into the sampling zone ZE.

In the case where both chambers 4 and 6 are variable volume chambers, both chambers can be interchanged and actuation of the valves and control of the underpressure sources are such that the aliquot is first injected into chamber 6.

In another exemplary embodiment, the supply inlets E1 and E2 are interchanged. In this case, upon injecting the reagent, it does not circulate into the sampling zone. Advantageously, the solution circulates in the sampling zone between both preparation chambers to collect the sample.

Preferably, the first secondary channel 8 and the fourth secondary channel 18 connect to the main channel 2 at different points, in order to reduce the risk of sucking the sample contained in the first secondary channel 8 upon collecting the solution for analysis thereof. Preferably, the fourth secondary channel 18 connects to the main channel closest to the first preparation chamber 4.

Advantageously, the outlet S2 is directly connected to the sampling zone which allows the secondary channel 18 for transferring the solution to the detection means to be flushed.

During a dilution cycle, the sample circulates in the channel 2 by passing through the sampling zone ZE and alternately filling the preparation chambers 4 and 6. During these different steps, the channel 18 can be contaminated by the sample due to the intersection 20, for example by diffusion effect, microleakage through the valves etc.

By connecting the outlet S2 directly to the sampling zone ZE the following flushing protocol with reagent can be applied. The protocol comprises keeping the solution prepared in the preparation chamber 4 by closing the valve V5, and then flushing the channel 8 by opening the valves V3 and V4, the reagent flows to S2. The secondary channel 18 is then cleaned.

In the example represented and very advantageously, the outlet S1 is connected directly to the sampling zone ZE. Upon filling the zone ZE, the valves V1 and V2 are opened, the sample circulates from the reservoir R1 to the outlet S1 connected to a waste bin and fills the zone ZE without circulating through the preparation chambers. Thus it is not required to clean the chambers before the preparation step (dilution, lysis . . . ) by means of the reagent contained in the reservoir R2 to avoid an error in the volume of the sample. The preparation method is simplified and faster.

By way of example, the calibrated volume Vc is a few tens of μL to a few hundreds of μL.

Figure 6:
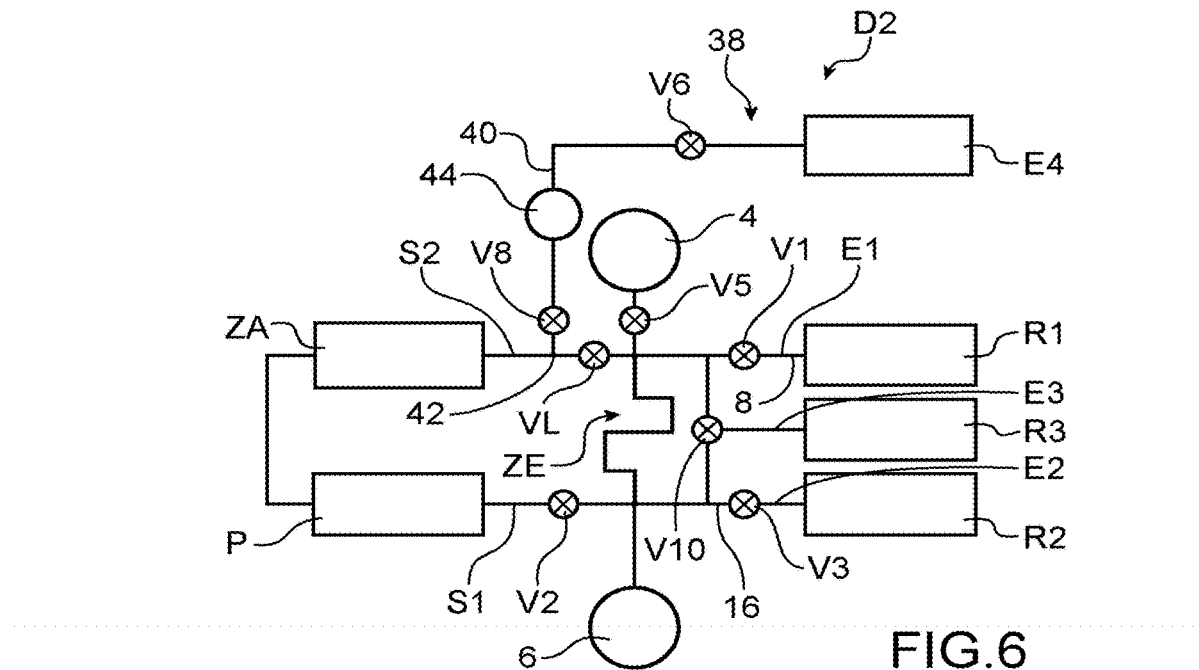
FIG. 6 is a schematic representation of another example of a device for preparing a solution.

In FIG. 6, another example of a particularly advantageous preparation device can be seen.

The preparation device D2 differs from the preparation device D1 in that it comprises means for washing/flushing the circuit with a washing/flushing liquid that is distinct from the reagent.

The same references as those of device D1 will be used again to refer to the elements having the same functions.

Device D2 comprises the main channel 2, supply inlets E1, E2, discharge outlet S1, collection outlet S2, both preparation chambers 4 and 6. Valves V1, V2, V3 and V4 are also disposed in the circuit as in device D1. Valve V5 is also provided at least for a pre-filling phase with reagent, as described above.

Device D2 further comprises a third supply inlet E3 for washing liquid connected to a secondary channel which is coupled to the secondary channels 8 and 16 each connected to the inlets E1 and E2. Inlet E3 is to be connected to a washing liquid reservoir R3. Inlet E3 also comprises a three-way valve V10 for connecting the reservoir R3 either to the first secondary channel 8 or to the third secondary channel 16.

Alternatively, all or part of the three-way valves are replaced by two-way valves in series with a T-junction channel.

The washing liquid is used to clean the whole circuit, as well as the analysis chamber in order to reuse it for another analysis.

Further, the device also comprises means 38 for generating gas bubbles having a calibrated volume in the fourth secondary channel 18 opening into the outlet S2. The means 38 comprise a secondary channel 40 connected by a connection 42 to the fourth secondary channel 18 between the valve V4 and the outlet S2, the secondary channel 40 is provided with a gas supply inlet E4 to be connected to a source of gas, for example air, a variable volume chamber 44, a valve V6 between the inlet E4 and the chamber 44 and a valve V8 between the chamber 44 and the connection 42.

The chamber 44 is for generating gas bubbles having a calibrated volume. It is, for example, of a similar structure to the first chamber 4, it comprises, for example, at least one elastically deformable wall having hyperelasticity properties. Alternatively, the chamber 44 comprises a syringe or a piston.

The gas bubbles have a volume of, for example, 30 μL to 60 μL, for example 2 to 4 times the volume of the analysis zone ZA.

For example, a calibrated gas bubble is produced before the solution is sent to outlet S2. The air bubble and the solution are sucked via the underpressure of the waste bin and/or the application of pressure to the membrane in the chamber. The presence of the air bubble avoids diluting the solution during transfer thereof to the analysis zone ZA.

The advantage of the direct connection of the outlet S2 to the zone ZE described in connection with D1 also exists for D2. Flushing with a flushing liquid can be provided.

The advantage of the device according to the invention is that it allows solutions with different solution rates to be prepared. It is therefore relatively flexible and adaptable.

According to one example of operation, the solution is prepared directly at the desired dilution rate.

The invention has a robust operation by allowing a time calibration to be avoided, indeed the time calibration depends on many parameters and is thus not very robust.

Advantageously, according to another example of operation, the solution at the desired dilution rate is obtained in several steps.

The operating steps are depicted in FIGS. 5A' to 5E'.

Steps 5A' to 5C' are identical to steps 5A to 5C respectively. At the end of step 5C', a first solution So1 has been prepared at a first dilution rate set by the volume Ve of the sampling zone and the volume Vc of the preparation chamber. The solution So1 is in chamber 4. Chamber 4 is emptied by sending the solution So1 to the waste bin (FIG. 5D'). At the end of this step, the sampling zone ZE is filled with the solution So1. Therefore, a volume Ve of the So1 solution has been taken. Step 5B' (arrow N) can then be applied again, by injecting the diluent via E2 which drives the volume Ve of So1 into chamber 4. And step 5C' is repeated. A solution So2 with a new dilution rate has been prepared.

Then either a new dilution can be made by performing step 5D' and then step 5B', or So2 can be transferred to the analysis zone via S2.

The dilution rate of the final solution is the product of the dilution rates of the solutions successively obtained. If the preparation chamber is deformed to Vc at each dilution step, the dilution rate is the same for all dilution steps and is for example equal to T, the final dilution rate after n dilution steps is equal to $T^n$. For example, if the dilution rate is 10% at each step, it is possible to successively obtain dilution rates of 1%, 0.1%, etc. At each dilution step, the successively obtained solutions So1, So2 . . . can either be sent to outlet S1 to be discharged, or sent to outlet S2 to be analysed.

Alternatively, it can be contemplated to vary the dilution rate between two dilution phases, by modifying the calibrated volume Vc of the preparation chamber.

This possibility of carrying out successive dilutions is particularly interesting and in demand in many biological tests, and it is complex to carry out accurately in microfluidics with the systems of the state of the art.

Successive dilution can be implemented for counting objects in large amounts, where high dilution rates are required. In devices of the state of the art, achieving high dilution rates raises sizing problems since large volume ratios have to be controlled. For example, a dilution of 0.1% can be complicated to size. By virtue of the sample preparation device of the invention, three successive dilutions of 10% or 2 dilutions of $(0.1\%)^{1/2}$ can be made, these successive dilutions implementing smaller volume ratios.

Further, performing successive dilutions offers the possibility of measuring or checking the value of the dilution rate. For example, let $C_0$ be the initial condition and R the known or unknown ratio of the fluidic system. A first cycle measures a concentration $C_1$, the second cycle measures a concentration $C_2$. The exact ratio value is $R=C_1/C_2$. The initial concentration can then be retrieved with $C_0=C_1 \times R=C_1^2/C_2$.

Thus the value of R can be qualified without having to know accurately Vc and/or Ve initially. In addition, since it is possible to determine the dilution rate of each device, technological constraints on reproducibility from one chip to another, or from one set of experiments to another, can be relaxed.

Figure 7:
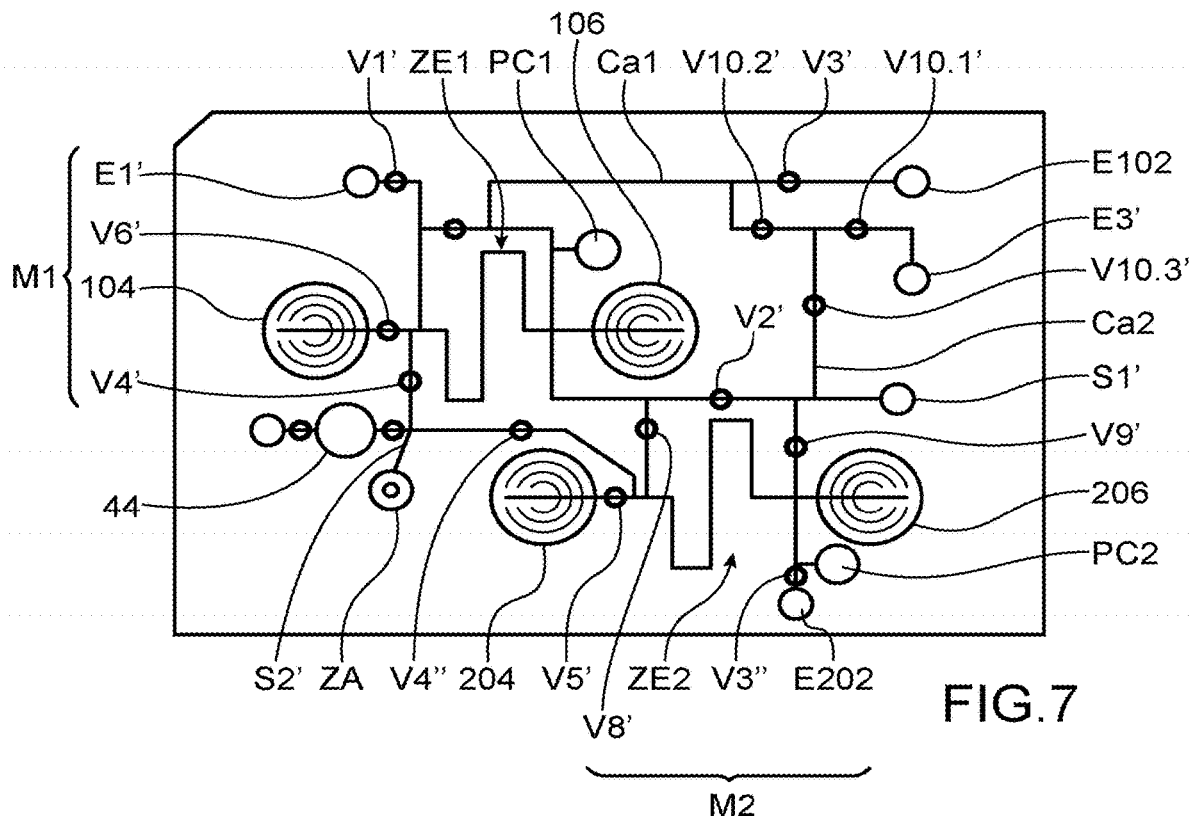
FIG. 7 is a schematic representation of another exemplary embodiment of a preparation device for preparing two different solutions from the same sample.

In FIG. 7, another exemplary embodiment of a preparation device for preparing two different solutions from the same sample can be seen.

The preparation device D3 combines two dilution modules M1 and M2. Each module M1, M2 comprises a fluidic circuit formed by several channels. For example, module M1 is to perform dilution and module M2 is to perform lysis.

Each module M1, M2 comprises its own preparation chambers 104, 108 and 204, 208, and its own sampling zone ZE1 and ZE2 respectively.

The sample supply inlet E1' is common to both modules. The analysis outlet S2' and the outlet S1' to the waste bin are also common to both modules.

Each module M1, M2 comprises a supply inlet E102, E202 for reagent R1, R2.

Valves V1', V2', V3', V3", V4', V4", V5', V6', V8', V9' are also provided in the different channels.

Both circuits are connected so that, during the sampling phase, the sampling zone ZE2 of module M2 is supplied with sample from inlet E1' via the sampling zone ZE1 of module M1.

The analysis outlet S2' is connected to the outlets of the first preparation chambers 104, 204.

The supply inlet E102 for reagent R1 is connected to the main channel of the module M1 via a secondary channel Ca1.

The device D3 further comprises a third supply inlet E3' for washing liquid R3 connected to the secondary channel Ca1 which is connected to the module M1, and to the module M2 via the module M1. The inlet E3' is to be connected to a washing liquid reservoir.

In this device, reagent R1 is used for dilution in module M1 and for priming/flushing the chip. Reagent R3 is added for washing and is injected through the third inlet E3'. The secondary channel Ca1 advantageously allows the inlets to be shared at the coils and chambers.

Valves V10.1', V10.2' allow the inlet E3' to be connected to either and/or both modules M1 and M2 and allow the flushing liquid to circulate in the different channels of the modules M1 and M2.

In this example, a valve V10.3' is provided in a channel Cat between the third inlet E3' and the outlet S1', which is used to flush the contact zone between reagent R3 and R2 with reagent R2 to avoid contaminations with reagent R3 in the case where reagent R3 would be incompatible with the sample, for example blood.

In this example, device D3 also comprises a chamber 44 for forming gas bubbles in the circuit, connected at outlet S2', similarly to device D2 in FIG. 6. The gas bubbles have the same function as in device D2.

The modules M1 advantageously comprise a pre-filling chamber PC1 on the channel connecting the reagent inlet E102 to the sampling zone ZE1.

The modules M2 advantageously comprise a pre-filling chamber PC2 on the channel connecting the reagent inlet E202 to the sampling zone ZE2.

The pre-filling chambers PC1 and PC2 are also variable volume chambers allowing them to be filled by suction.

The pre-filling chambers allow the volume of reagents injected into chambers 104 and 204 to be calibrated in order to have even more controlled mixing and/or reaction. The pre-filling chambers can be implemented in all the preparation devices described above. They generally apply to any device according to the invention. They can be placed at the sample inlets downstream of the valve associated with each inlet. Furthermore, all or part of the sample supply inlets are equipped with such pre-filling chambers.

An example of operation of device D3 will now be described. In this example, the reagents are injected into the chambers 104, 204 before the sample.

Initially, a state in which all valves are closed is considered.

First, a step of pre-filling with reagents takes place in chambers 104 and 204 via the pre-filling chambers PC1 and PC2.

For this, the valves V3' and V3" are opened and the pre-filling chambers are activated to suck in the reagents R1 and R2, i.e. their volume is increased.

Valves V3' and V3" are closed.

Valves V6' and V5' are then opened and the volumes of reagents R1 and R2 contained in pre-filling chambers PC1 and PC2 are transferred to chambers 104 and 204.

All valves are then closed and blood injection is started.

During the sampling phase, only valves V1', V8' and V9 are opened, the sample fills the sampling zones ZE1, ZE2. This phase lasts a calibrated time.

Then valves V1', V8' and V9 are closed. Then the step of injecting the remaining reagents begins, in which valves V3', V3", V5' and V6' are opened. Each aliquot and its reagent are injected into their preparation chamber 104, 204. Valves V3', V3" are closed.

The mixtures are then decanted from chamber 104, 204 to chamber 108, 208 and perform back and forth movements to improve mixing.

As mentioned above, module M1 is used to perform dilution and module M2 is used to perform lysis. It can be contemplated to continue to mix the reagent R2 and blood in module M2 by transferring them between both chambers 204 and 206, while simultaneously analysing the mixture obtained in module M1.

Alternatively, it can be contemplated to store ready solutions in chambers 104, 204, and then send them to outlet S2' for analysis thereof in zone ZA. During this last step, sending both solutions is performed successively.

Preferably, flushing is carried out with the reagent used to prepare the solution to be analysed. Before the analysis of the solution prepared in module M1, the zone ZA is flushed with reagent R1, and before the analysis of the solution prepared in module M2, the analysis zone is flushed with reagent R2.

For example, at the end of the analyses, both modules are flushed with reagent R3.

Between the passage of both solutions, a flushing step with the flushing fluid from E3' has taken place.

The steps of injecting and mixing both solutions can be carried out simultaneously.

It will be understood that more than two modules can be implemented.

In another example, the device comprises at least two supply inlets for two different samples and one or more supply inlets for different reagents.

It will be understood that all configurations are contemplatable, for example it can be contemplated to prepare a first solution from a sample and a reagent, then from a sample of this first solution, to prepare a second solution with another reaction.

By way of non-limiting example, the preparation device can have the following dimensions:

The device is substantially of the size of a credit card, for example with a side of between 5 cm and 10 cm.

It has a thickness of 1 mm to a few mm, for example 3 mm.

The main channel outside the sampling zone, and the secondary channels have a square or rectangular cross-section with a side of a few hundred µm, for example 300 µm×300 µm.

The sampling zone has a square or rectangular cross-section with a side of a few hundred µm, for example 700 µm×300 µm.

The preparation chambers have a maximum volume in the order of one µL to a few hundred µL, for example 200 µL. For example, they have a spherical or cylindrical cap shape, for example a height of 3 mm and a diameter of 5 mm to 10 mm.

The channels and chambers with the above dimensions are for example made by embossing, moulding, or mechanical machining.

Using structuring techniques used in microelectronics, channels and chambers with dimensions 10 to 100 times smaller than the above dimensions can be made.

A test showing the robustness and reliability of the preparation device according to the invention will now be described.

A dilution of blood of 0.16% (1/600) is obtained by double dilution with a device such as device D2 by using a red cell spherisation reagent, in order to perform lens-free imaging counting. Such a counting is for example described in document FR3060746.

The device comprises a 10 µL calibration coil and preparation chambers with a volume of 235 µL for obtaining a dilution rate of 4% (1/24.5) which, after a double dilution, allows the desired dilution rate of 0.16% (1/600) to be achieved.

Figure 8:
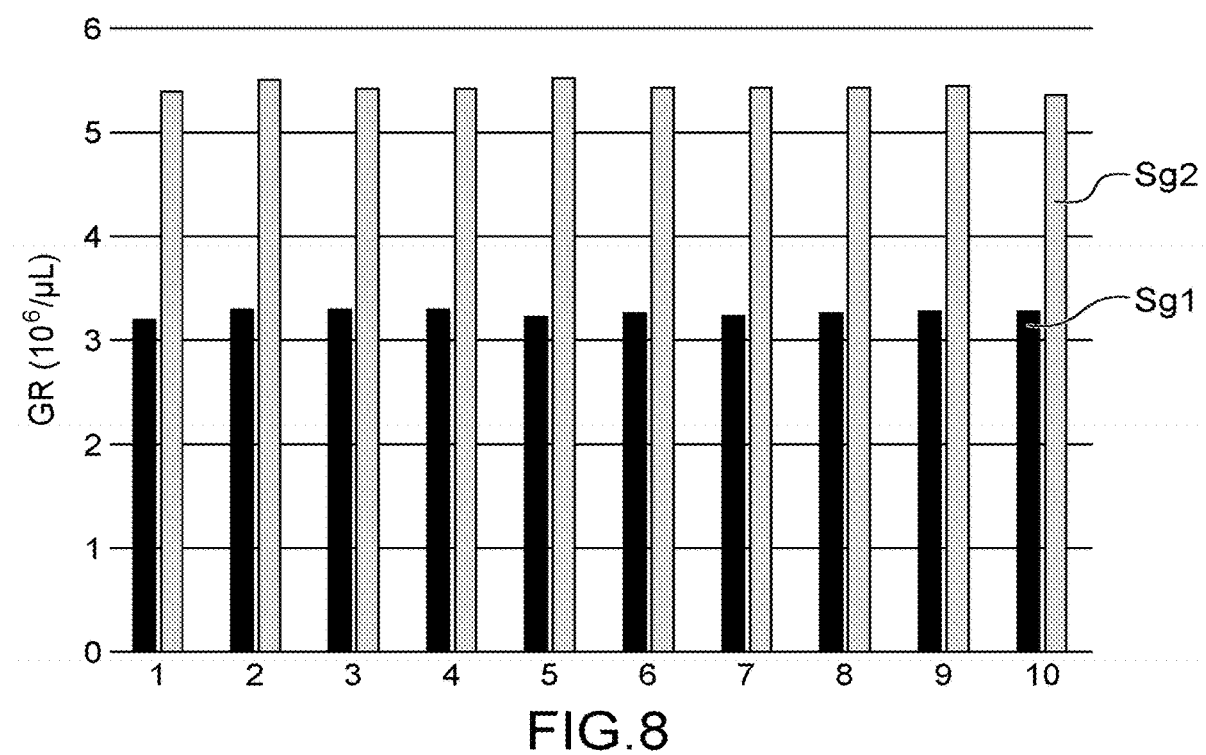
FIG. 8 is a graphical representation of measurements of the number of red blood cells per $10^6/\mu L$ for two blood samples: Blood 1 and Blood 2 and for ten measurements, obtained by virtue of the device of the present invention.

In FIG. 8, the number of red blood cells GR per µL for two blood samples can be seen: Sg1 and Sg2 and for ten successive measurements performed with the same microfluidic device.

Coefficients of variation of 1.1% and 0.9% are obtained for Sg1 and Sg2 respectively. As a result, the preparation device has a high performance in terms of preparation repeatability and counting.

Figure 9A:
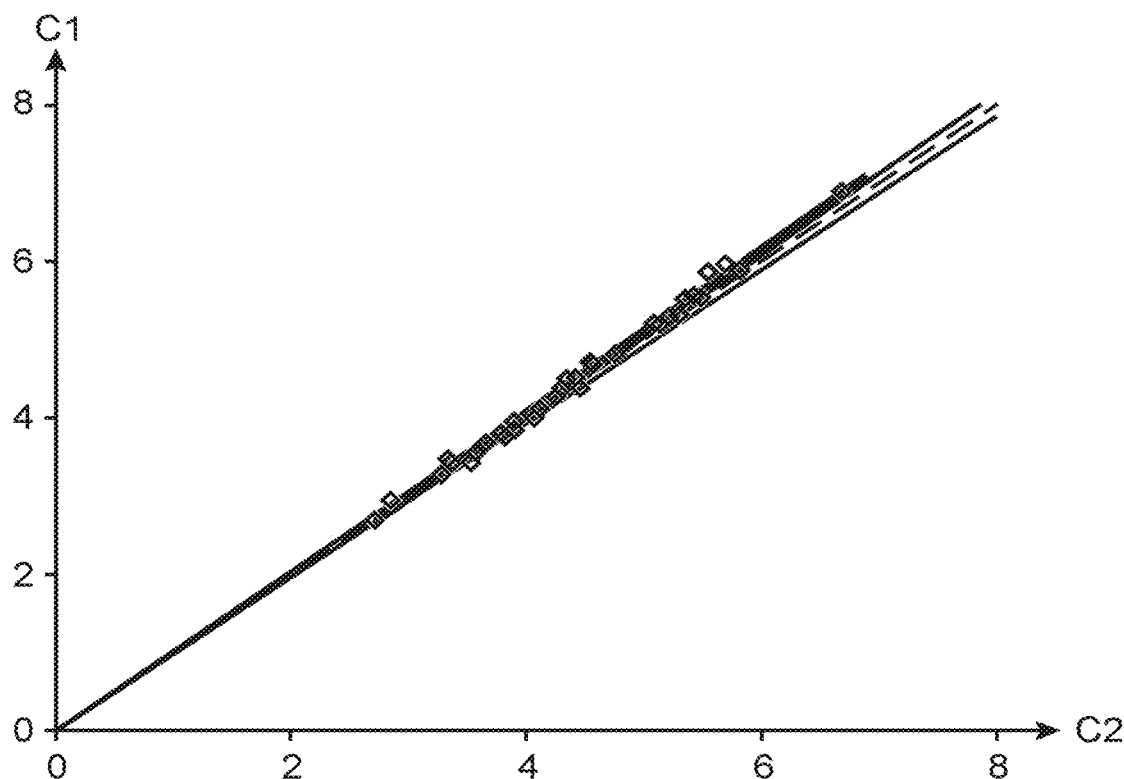
FIG. 9A is a graphical representation of the correlation with the Passing Bablock method, between counting carried out in lens-free imaging from a solution obtained with a preparation device according to the invention and counting carried out by means of an ABX Pentra DX120 haematology automaton, on 37 human blood samples.

In FIG. 9A, a correlation graph with the Passing Bablock method can be seen, between a lens-free imaging counting C1 carried out from a solution obtained with a preparation device according to the invention (ordinate axis), and a counting C2 carried out by means of an ABX Pentra 120DX haematology automaton of the state of the art (abscissa axis), on 37 human blood samples. In abscissa and ordinate, this is the number of red blood cells per $10^6$/µL.

Figure 9B:
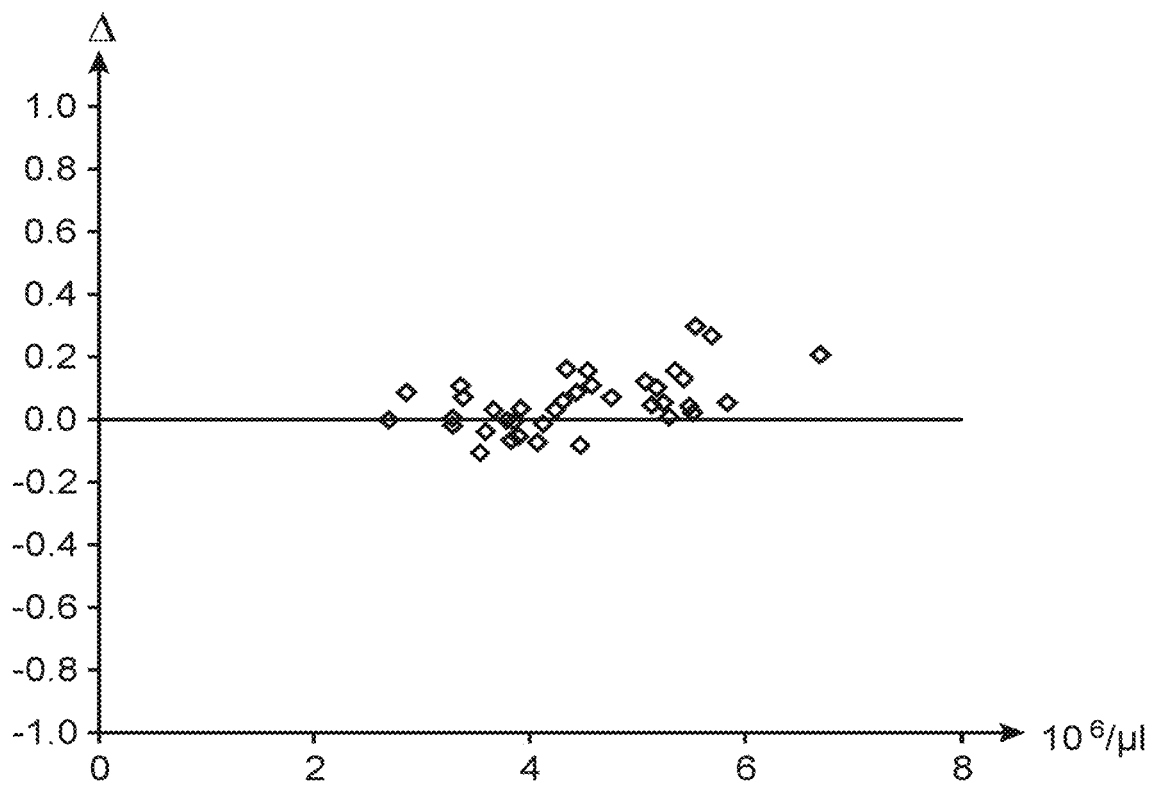
FIG. 9B is a graphical representation of counting measurements of FIG. 9A as Bland-Altman differences.

In FIG. 9B, this is a graph representing counting measurements as Bland-Altman differences to the measurements in FIG. 9A. The difference Δ is represented on the ordinate axis and the measurements obtained by means of the ABX Pentra DX120 haematology automaton of the state of the art are on the abscissa axis. It is noticed that both methods are statistically equivalent.

An example of a method for manufacturing a preparation device of the present application will now be described.

Figure 10:
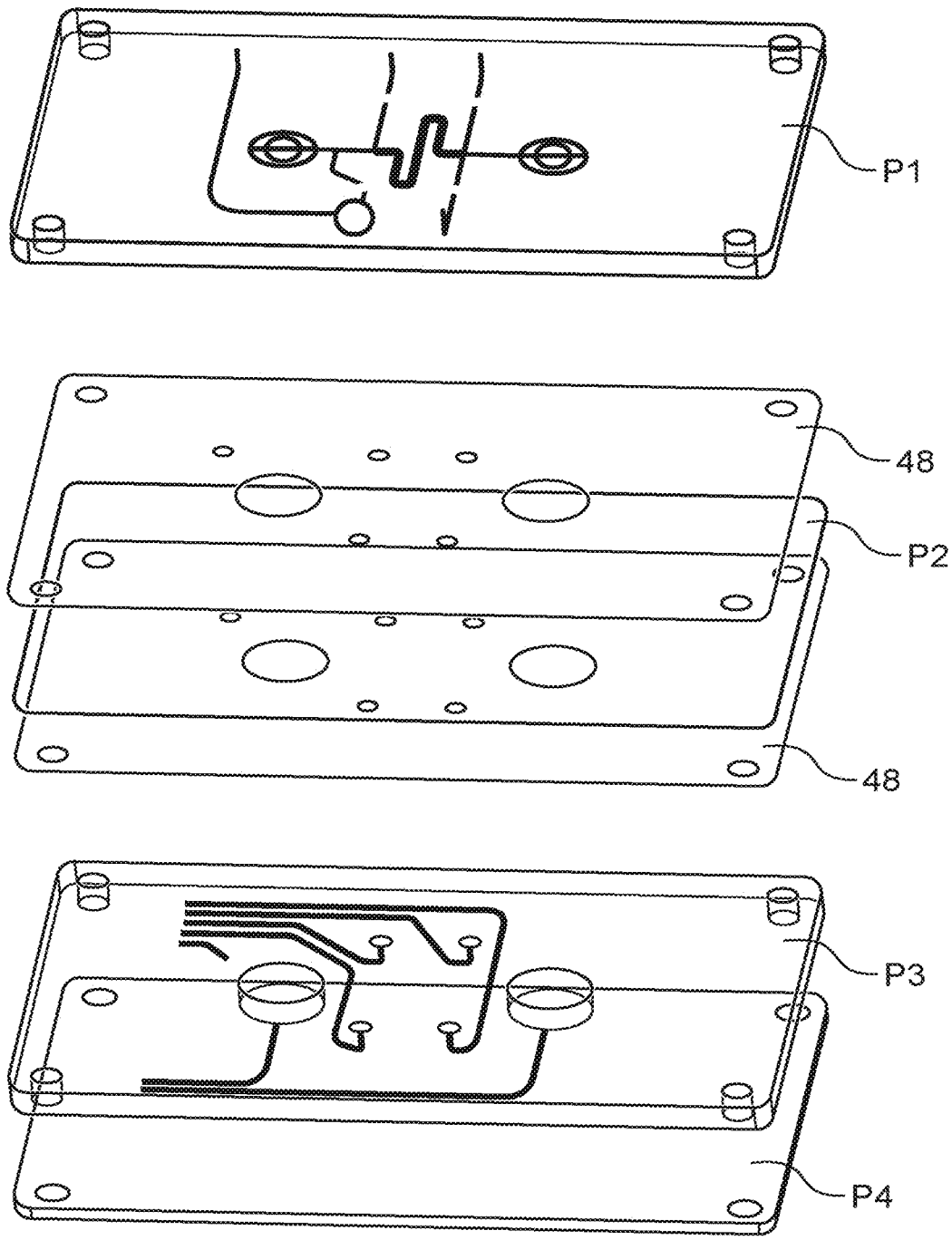
FIG. 10 is an exploded view of a practical exemplary embodiment of the preparation device of FIG. 1.

In FIG. 10, an exploded view of an example of a preparation device obtained by superimposing elements having for example the dimensions of a credit card can be seen.

The device comprises:
- a first plate P1, called a fluidic plate, comprising a structured face in which the channels are made, and in which the liquids circulate,
- a second plate P2 of hyperelastic material or membrane covering said face provided with channels
- a third plate P3, called a pneumatic plate, in which cavities for the valves and cavities of the preparation chambers are made, in which the membrane will come to press when an underpressure is applied in order to let a liquid pass in the case of a valve or to fill a preparation chamber. Pneumatic addressing channels, connecting the cavities to a pressure source, are also made in plate P3,
- a fourth plate P4 closing the cavities of the chambers.

It is to be noted that the cavities of the valves do not generally pass through plate P3.

The plates P1, P3 and P4 are preferably of polymeric materials, for example polymethyl methacrylate (PPMA), plexiglass, and very advantageously cyclo-olefin copolymer (COC). COC has the advantage of being resistant to solvents and flushing products. Alternatively, they are made of glass or silicon. The plates can be structured by embossing, moulding or mechanical machining.

The plates P1, P3 and P4 are, for example, between a few tens of microns and several mm thick, typically 3 mm.

The plate P4 is for example 0.5 mm thick.

The pneumatic plate P3 is for example 3 mm thick.

The fluidic plate P1 is for example 3 mm thick.

The plate P2 is of a material with a very high elastic deformability. For example, the plate is of a silicone material called Ecoflex® manufactured by the company Smooth On. This material has an elongation rate of 800%. For example, the P2 plate is made by centrifugal spin coating.

Among the materials that can be used to manufacture the plate P2, there are especially elastomers from the silicone family such as MQs (methyl polysiloxanes), VMQs (vinyl-methyl polysiloxanes), PVMQs (phenyl-vinyl-methyl polysiloxanes) or thermoplastic type elastomers (TPE), for example TPE-S, TPS, TPE-E, TPC.

The plate P2 is, for example, between 50 μm and 200 μm thick. The plate P2 provides isolation between liquids and gases, so the plate material is adapted to support liquids used and has low gas permeability.

In the example represented, in order to secure the plates P1, P2 and P3 together, double-sided adhesive layers 48 are provided between the first plate P1 and the second plate P2, and between the second plate P2 and the third plate P3. The adhesive layers are cut at the zones where the film is to be actuated, that is, at the valves and preparation chambers. The cuts are made, for example, by a cutting machine, by laser or water jet. This cutting step takes place before the film is placed on one of the plates.

Then, the one adhesive layer 48 is aligned and laminated on the face of the pneumatic plate P3, for facing the second plate P2. The other adhesive layer 48 is aligned and laminated on the structured face of the fluidic plate P1. The second plate P2 is then laminated on one of both plates P1 and P3 and then pressed against the other chip.

In another exemplary embodiment, both plates P1 and P2 and the membrane 46 are joined by mechanical means, for example by mechanical clamping.

Alternatively, bonding by double-sided adhesive material layers can be replaced by $O_2$ plasma bonding or by bonding by means of an adhesive shaped, for example by screen printing.

Still alternatively, the various modes of securing by bonding and/or modes of securing by mechanical means can be combined.

The preparation device according to the invention is particularly adapted for medical application, for example for blood and biological fluid analyses. It can also be applied in other fields, for example in the field of analysis of pollutants in effluents and/or waterways.

In view of making the preparation device in the form of a small chip, preferably of polymer, it can be contemplated to make single-use devices, which can be particularly interesting in the medical field to avoid contaminations between two analyses.

The invention claimed is:

1. A device for preparing at least one solution having a calibrated volume Vc from at least one first sample and at least one first reagent, comprising:
    a microfluidic network including at least one first supply inlet for a first sample, at least one second supply inlet for a first reagent, at least one discharge outlet, at least one collection outlet for the at least one solution to be analysed, a first sampling zone having a calibrated volume Ve to which the first inlet and second inlet are directly connected, at least first preparation chamber and second preparation chamber connected to the first sampling zone and disposed on either side of the first sampling zone so that the fluid for circulating from one preparation chamber to the other circulates in the first sampling zone,
    wherein the at least one first supply inlet is fluidly connected to the first sampling zone on a first side of the first sampling zone, and the at least one second supply inlet is fluidly connected to the first sampling zone on a second side of the sampling zone opposite to the first side,
    wherein the first preparation chamber has a variable volume between a minimum volume V0 and the calibrated volume Vc,
    wherein the second preparation chamber has a variable volume,
    wherein said device also comprises valve devices for allowing or interrupting fluid circulation at least at the first and second inlets and at the at least one collection outlet and the at least one discharge outlet, and
    wherein the first and second preparation chambers include at least one deformable wall comprised of a hyperelastic material.

2. The preparation device according to claim 1, wherein the second supply inlet for the first reagent is connected to the first sampling zone, so that upon injecting the first reagent into the first preparation chamber, the first reagent passes through the first sampling zone.

3. The preparation device according to claim 1, wherein one of the valve devices is located at an inlet of the first preparation chamber.

4. The preparation device according to claim 1, further comprising at least one additional supply inlet for a second reagent, a second sampling zone and third and fourth preparation chambers connected to the second sampling zone and disposed on either side of the second sampling zone, so that the fluid for circulating from one of the first preparation chamber or second preparation chamber to an other of the first preparation chamber or second preparation chamber circulates in the second sampling zone, at least the third preparation chamber having a variable volume between a minimum volume V0' and at least one calibrated volume Vc', wherein the second sampling zone is connected to the first supply inlet for a first sample so that, upon filling the first sampling zone, the second sampling zone is filled, and a valve device for allowing or interrupting fluid circulation which is located at an inlet of the third preparation chamber.

5. The preparation device according to claim 1, further comprising at least one gas supply inlet for a circuit flushing fluid and/or gas bubble generator for generating gas bubbles having a calibrated volume, wherein the gas bubble generator is located between the at least one gas supply inlet and the at least one collection outlet.

6. The preparation device according to claim 1, wherein the collection outlet is connected to the sampling zone via a channel so as to allow liquid circulation in the channel between the sampling zone and the collection outlet.

7. An assembly comprising at least one preparation device according to claim 1, and a support comprising at least the sample reservoir, at least the reagent reservoir, a controller configured to activate an actuator for actuating the valve devices for allowing or interrupting fluid circulation, a device for modifying the volume of the first preparation chamber and the volume of the second preparation chamber, and an analyser connected to the collection outlet.

8. The assembly according to claim 7, wherein the controller is configured to transfer the solution between the first preparation chamber and the second preparation chamber through the sampling zone.

9. The assembly according to claim 7, wherein the controller is configured to inject, into the first preparation chamber, a first amount of reagent, prior to injecting a volume of sample measured by the sampling zone.

10. The assembly according to claim 7, wherein the analyser allows elements contained in the solution to be quantified and/or qualified.

11. A method for preparing a solution implementing a preparation device according to claim 1, comprising:
    a) a sampling phase during which the sampling zone is filled with the sample,
    b) a phase of injecting the sample volume Ve contained in the sampling zone into the first preparation chamber,
    c) a phase of injecting a volume of reagent into the preparation chamber until the volume of the first preparation chamber reaches the calibrated volume Vc,
    d) a phase of transferring the solution between the first preparation chamber and the second preparation chamber so as to mix it and collect sample traces in the sampling zone.

12. The preparation method according to claim 11, wherein the injection phase c) takes place through the first sampling zone.

13. The preparation method according to claim 11, comprising a step of injecting an amount of reagent into the first chamber prior to injecting the calibrated volume of sample.

14. A method for analysing a solution implementing the assembly according to claim 11, comprising preparing the solution and transferring the solution from one of the preparation chambers to the analyser through the collection outlet.

\* \* \* \* \*